Feb. 15, 1944.  A. W. FULLER  2,342,045
APPARATUS FOR UNSOLDERING GAS METER AND THE LIKE HOUSINGS
Filed April 24, 1942   5 Sheets-Sheet 1

INVENTOR.
ALFRED W. FULLER.
BY Ward, Crosby & Neal
ATTORNEYS

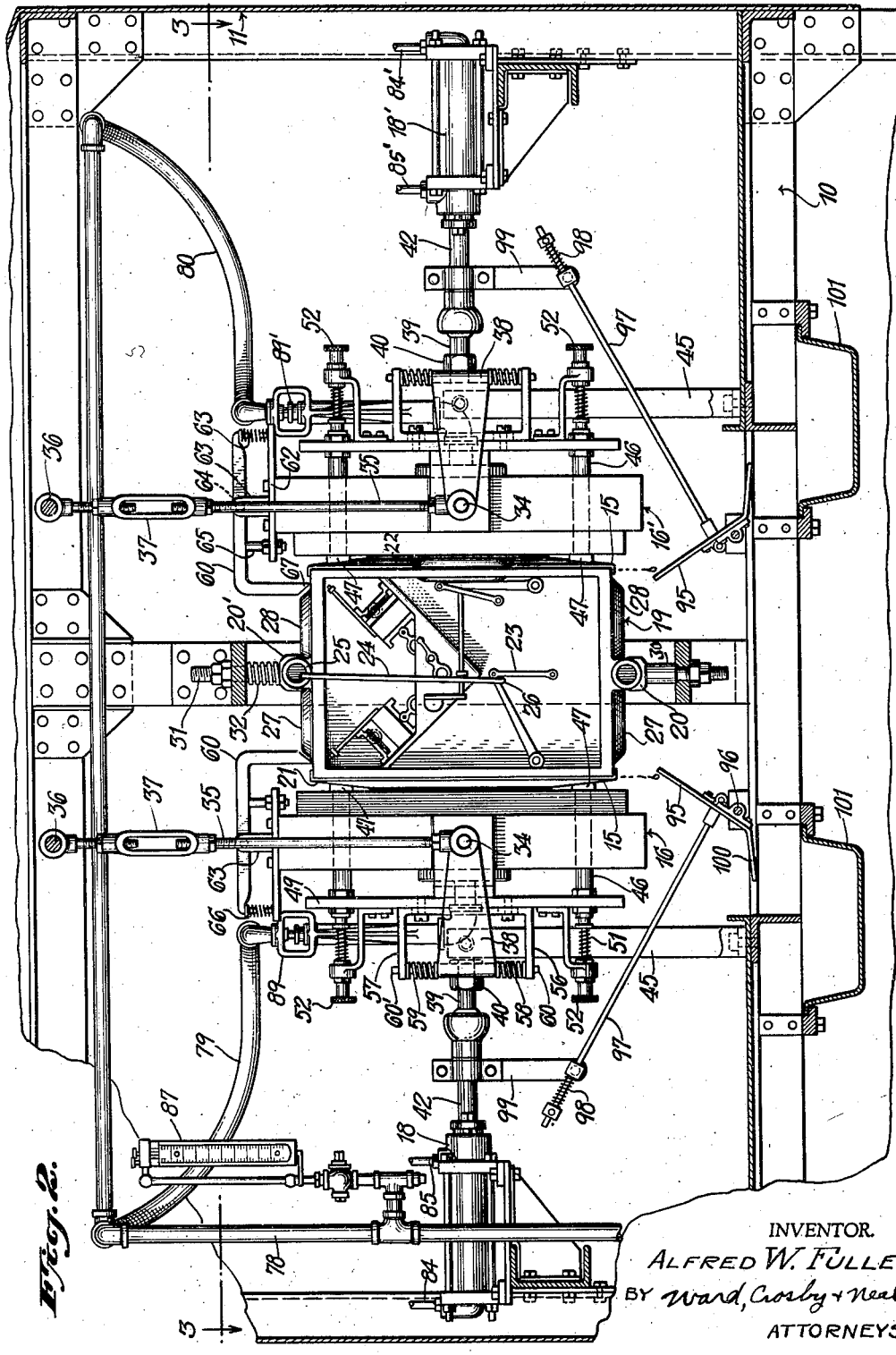

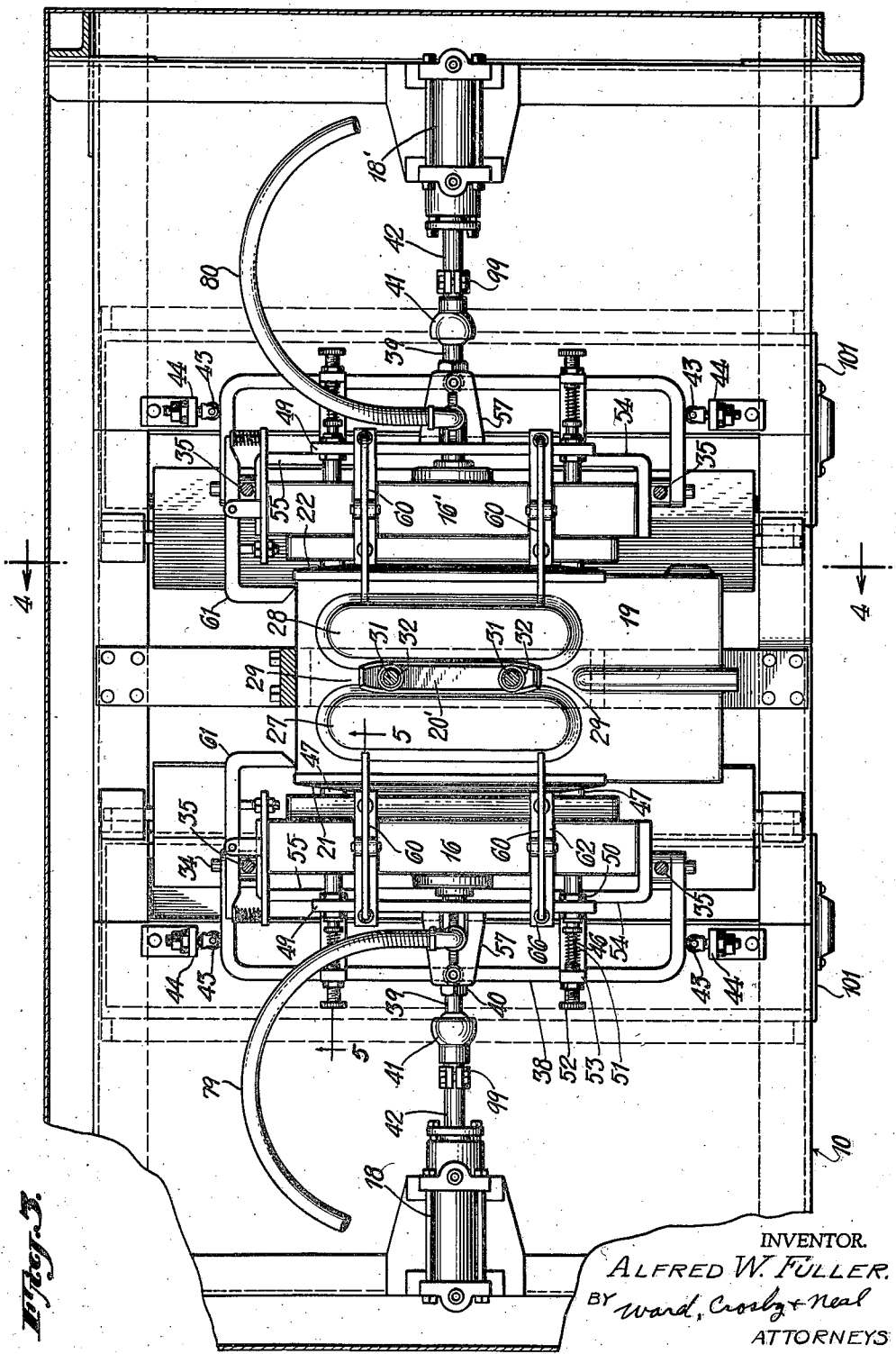

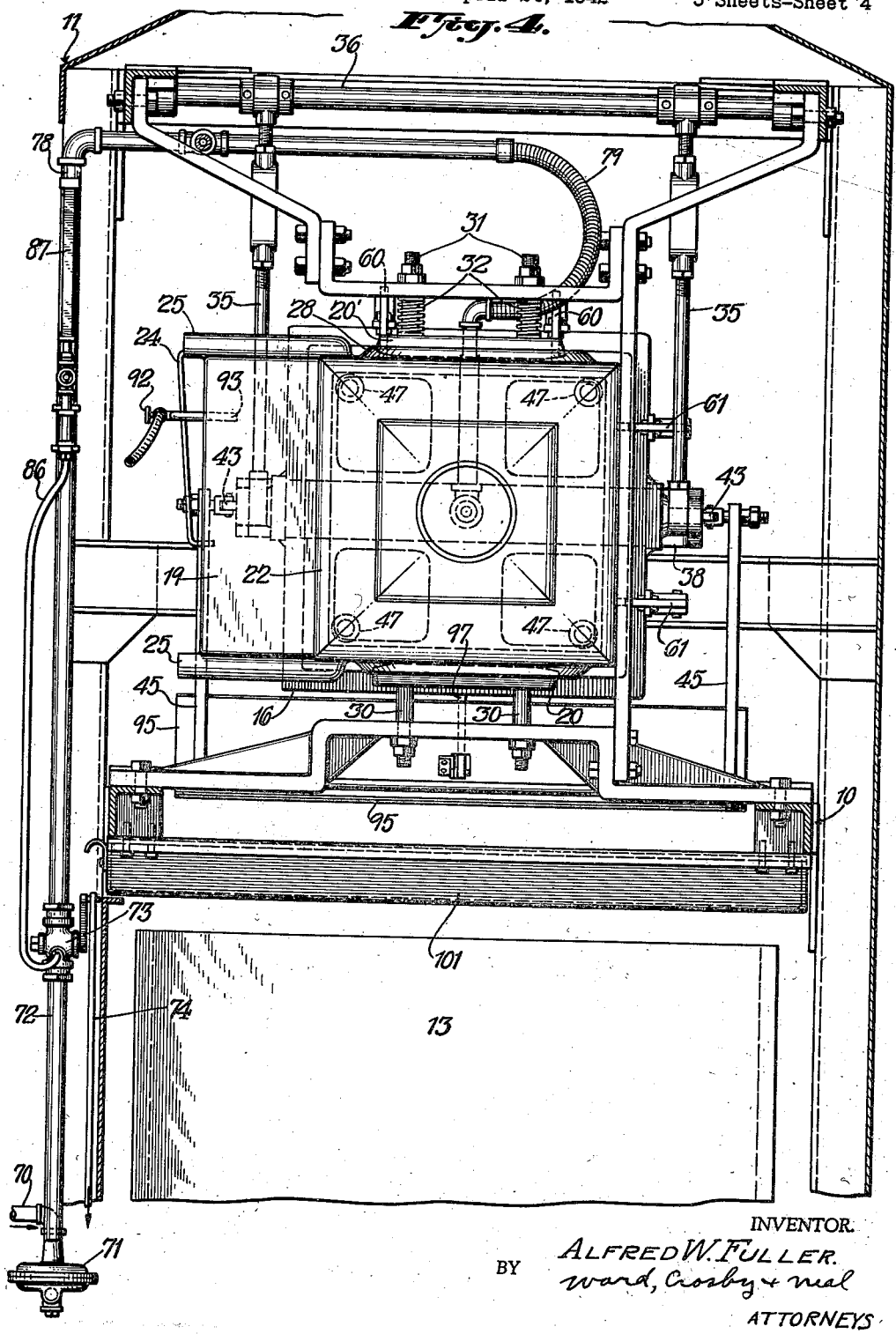

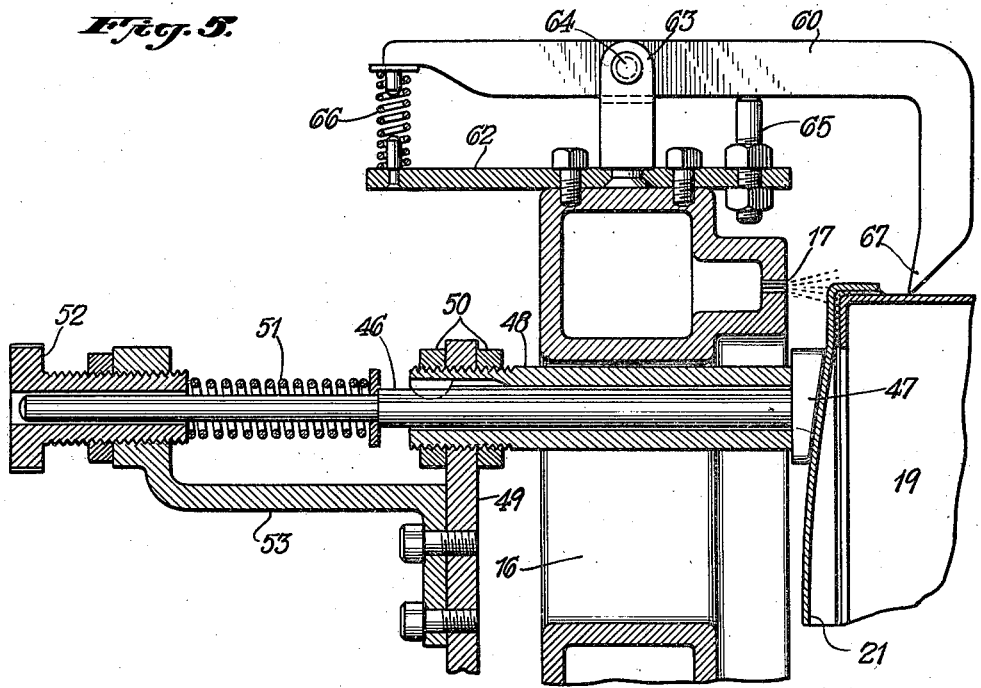
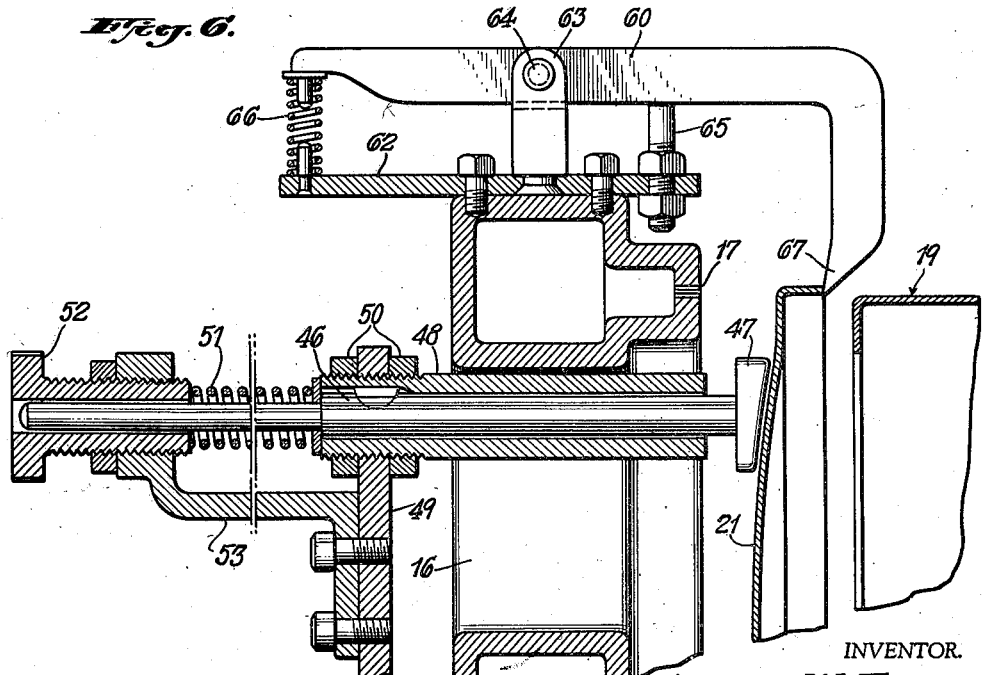

Patented Feb. 15, 1944

2,342,045

UNITED STATES PATENT OFFICE 2,342,045

APPARATUS FOR UNSOLDERING GAS METER AND THE LIKE HOUSINGS

Alfred W. Fuller, Short Hills, N. J., assignor to Consolidated Edison Company of New York, Inc., New York, N. Y., a corporation of New York Application April 24, 1942, Serial No. 440,412

7 Claims. (Cl. 113—1)

This invention relates to apparatus for unsoldering the soldered seams of housings and receptacles, such for example as the housings of used gas meters.

Common forms of gas meters are contained in soldered sheet metal housings and when the meter becomes inaccurate or inoperative, or has been in prolonged use, it is necessary or advisable to open the housing and recondition the meter. This generally requires unsoldering and removing the top wall and two opposite side walls. With large gas distributing systems, very large numbers of the meters annually have to be thus opened up for reconditioning. This is a troublesome and expensive procedure because of the skilled labor and time required to do this work manually with sufficient care to avoid injury to the meter parts. Also there is sometimes danger that the heat applied to melt the solder will cause explosive gases to be evolved from the tar-like deposits inside the meter, with consequent possibilities of explosions.

The difficulties of manually unsoldering the housings arise from the fact that while portions of the soldered seams may be readily fused, this will be of no avail unless the solder along substantially the entire periphery of a wall portion is fused simultaneously so that the portion may be removed without danger of bending, or otherwise injuring same. Despite the necessity of concurrently fusing long seams of solder, heat can only be applied in controlled amounts and with care. If the temperature or the time of its application at any one area is too great or too extended, sufficient heat may be conducted away to injure adjacent parts of the meter or to unsolder portions which do not need to be unsoldered for the reconditioning operations.

The present invention so far as is known, provides for the first time, apparatus for performing such unsoldering operation substantially automatically. Further, the invention provides a method which makes it possible to use substantially a minimum and safe amount of heat for fusing the solder, also the application of such heat and removal of the wall portions, under conditions which are accurately controlled to avoid any danger of overheating or other injury to the parts, or dangers from explosions. As a consequence, with this invention a single operator without exceptional skill can safely open up hundreds of meters during the course of a day without injury of any of the parts, whereas heretofore many skilled men have been required to do this work.

According to a preferred form of the apparatus of this invention, means is provided whereby the meter may be quickly slid between resilient clamping means for retaining the housing in a fixed position during the operation of removing its side and/or top walls. Mechanism is provided for then simultaneously moving gas burners into positions facing each of the walls to be removed. These burners are preferably shaped to provide ribbon-like flames extending along and projected against the soldered outlines of the parts to be removed. The burners may be supplied with gas maintained at a predetermined regulated pressure and the burners may come into predetermined spaced positions with respect to the soldered seams, to insure applying the correct amount of heat at each point, to quickly fuse all the seams simultaneously without overheating any of the parts, and without danger of conduction of sufficient heat into the meter to injure the working parts. Also the mechanism for bringing the burners into position may act to turn up the flames and at the same time place suitable hook or grappling means in position for engaging the edges of the walls or cover plates which are to be removed. Then after the flame has been applied for a predetermined time, the burner operating mechanism may be operated, or may act automatically to retract the burners, lower the flames, and substantially concurrently retract the hook means for pulling off the unsoldered plates or wall portions. During the time that the flames are being applied, arrangements may also be provided for purging the interior of the meter of explosive gas mixtures, by flushing out the cavities with a combustion inhibiting gas such as carbon dioxide, for example.

Various further and more specific objects, features and advantages will more clearly appear from the detailed description given below taken in connection with the accompanying drawings which form a part of this specification and illustrate merely by way of example, preferred forms of the invention. The invention consists in such novel features, arrangements and combinations of parts as may be shown and described in connection with the apparatus herein disclosed.

In the drawings,

Fig. 1 is a perspective view illustrating a preferred form of the apparatus of the invention;

Fig. 2 is a front elevational view showing various operating parts of the apparatus of Fig. 1 in further detail in connection with a gas meter clamped in position ready to have its side walls removed;

Fig. 3 is a horizontal sectional view taken substantially along line 3—3 of Fig. 2;

Fig. 4 is a vertical sectional view taken substantially along line 4—4 of Fig. 3;

Figs. 5 and 6 are sectional views taken substantially along line 5—5 of Fig. 3 and showing certain parts in further detail and in two different operative positions respectively.

Figure 7:
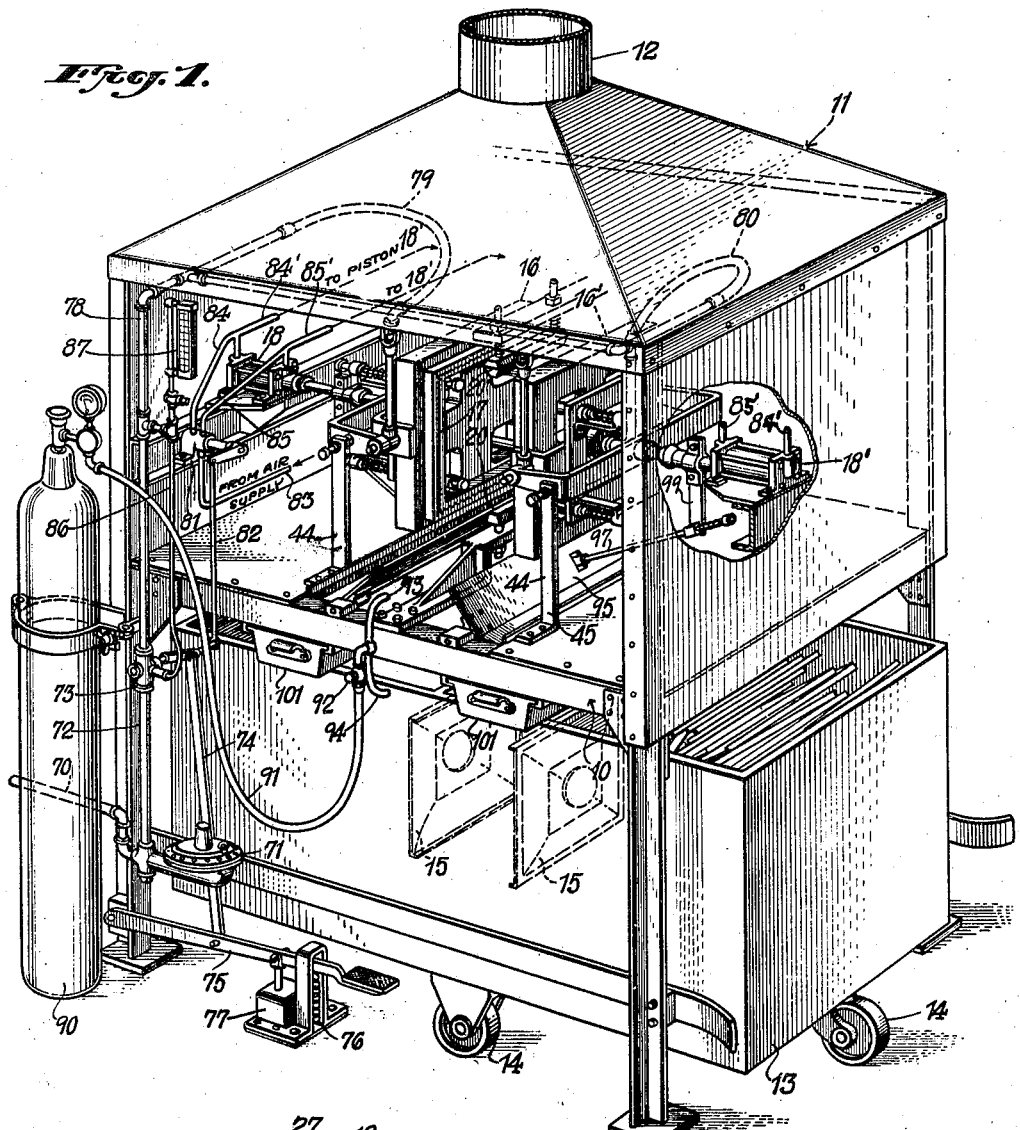
Fig. 7 is a perspective view of a gas meter housing of which two opposed side walls and also a top wall have been removed as by the apparatus of the invention.
Figure 7:
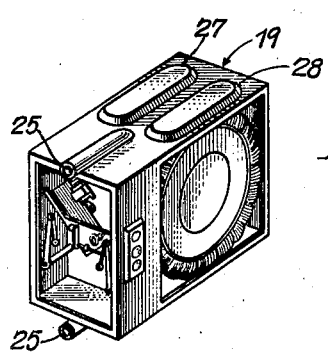

As shown in Fig. 1, the apparatus may be mounted at a suitable height for the convenience of the operator, on a frame structure 10, the upper part of which may be partially enclosed by a hood structure 11, at the top of which a ventilating duct may be connected as at 12 for running to a suitable point of disposal of the fumes and gases evolved during the unsoldering operations. The front side of the hood structure 11 may be left open as shown for access to the apparatus by the operator. The lower part of the frame structure 10 is preferably so shaped and arranged that a bin or container as at 13, mounted on rollers or trucks 14, may be pushed into and out of place under the apparatus for receiving unsoldered wall portions as shown by dotted lines at 15, these portions being free to fall into the container 13 upon being unsoldered and slightly displaced from the meter housing.

The unsoldering apparatus may include a pair of burners 16, 16', each constructed and arranged to project a ribbon of flame horizontally from so-called ribbon type burner outlets as at 17. These flames are shaped to extend along and to be substantially confined to the seam to be unsoldered, that is, for example to the soldered perimeter of a side or top wall or plate which is to be removed. The burners 16, 16', respectively, may be connected through suitable means hereinafter described, to fluid operated plunger and cylinder means as at 18, 18' for alternatively moving the burners into active positions with a predetermined close spacing from the seams to be unsoldered, or for retracting the burners to inactive positions, permitting the meter housing or the like, to be more readily inserted or removed from the apparatus.

In Figs. 2-4, a common form of gas meter is shown at 19, positioned on its side, with its top end toward the observer in Fig. 2, and removably secured by lower and upper clamping members 20, 20'. As shown in Fig. 2, the top wall or cover plate of the meter has already been unsoldered and removed either manually or by apparatus similar to that here described. In the position shown in Figs. 2-4, the meter is ready to have its two side walls or plates 21, 22 unsoldered.

In their normal positions of rest, the bellows in this type of meter may be in contact with or close to the side walls or plates 21 or 22 and consequently when these walls are heated for unsoldering the seams, the bellows being formed of leather or other combustible material, are liable to be injured. It has been found, however, that the bellows may be brought into positions sufficiently spaced from the side walls to avoid danger of injury, if one of the flag arms as at 23, is held in the position shown in Fig. 2 during the side wall unsoldering operations. This may be accomplished by using a rod as at 24 having simple hook-like upper and lower ends (not shown), the upper end being hooked into the meter inlet connection, for example as at 25, and the lower end being hooked to the flag arm as at 26.

Gas meters with housings of the type shown, which are typical, customarily have their narrowest side walls each formed with a pair of raised portions as at 27, 28, to provide interior spaces for movement of the bellows. Consequently there exists an elongated groove or channel-like area 29 between these two raised areas as appears in Fig. 3. These channel-like areas provide a convenient means for slidably receiving the clamping members 20, 20'. These members may be formed with relatively elongated jaws (Figs. 3, 4) shaped to closely and slidably engage the channel areas 29 when the meter housing is pushed into place by the operator standing in front of the machine. The lower clamping member 20 may be carried on a pair of studs as at 30, rigidly bolted to a part of the frame. The jaw 20 of the upper clamping member 20' is preferably carried on a pair of studs as at 31 slidable to a limited extent vertically with respect to an upper part of the frame structure. A pair of coil springs as at 32 serve to resiliently urge this upper jaw downwardly into the desired slidable clamping engagement with the meter housing. It will be apparent that the operator will be able to very quickly insert and remove a meter housing between clamping members of this type, and that the housing will be held secure against movement or displacement vertically, sidewise or by turning. The spring means 32 renders it unnecessary to use any clamping screws or the like devices which might mar or dent the sheet metal housing.

Each of the burners 16, 16' may be carried on horizontally extending trunnions as at 34, which are suspended to swing in directions toward and away from the meter housing by rods as at 35 pivotally carried at their upper ends as on rock shafts 36 supported in the upper part of the frame structure. These rods may be adjustable in length as by the insertion of turn buckles 37, permitting adjustment of each side of each burner to the desired height.

The trunnions for each burner may also be interconnected by a yoke member as at 38 extending horizontally around the rear side of each burner from one trunnion to the other, these yokes at their mid points in back of each burner being connected to thrust rods as at 39 as by a threaded connection and lock nut 40. The thrust rod 39 in turn may be connected as through a ball-and-socket joint 41, to a piston rod 42 of plunger device 18 or 18'. Although a ball and socket joint as at 41 is preferred, other suitable types of thrust transmitting joints having flexibility in any transverse direction may be used. Such joints will be referred to in the appended claims as universal thrust joints. Upon operation of the cylinder devices 18, 18', it will be apparent that the yoke members 38 will thrust the burner trunnions 34 and the two burners respectively toward the opposite side walls of the housing 19. The plungers in the cylinders 18, 18' preferably have a stroke such as to move the burners for example, from about 1 to 2 inches, from inactive to active position. During this movement each side of the yoke members 38 may preferably be guided against horizontal displacement transversely, as by small guide rollers 43 carried by adjustable mounting means as at 44, which in turn may be carried on supports 45.

Means will now be described for spacing the faces of the burners with respect to the housing walls which are to be unsoldered and for at the same time tilting if necessary the burners so that the faces thereof will be in proper vertical position. This means may include a plurality of slidable pin members as at 46 (Figs. 5, 6). One of these members may pass through each corner of each burner, and may be formed with a head portion as at 47, preferably with a face area shaped to conform with the contour of the housing wall portion which it is to engage. Also these head portions are preferably made of relatively large area so as to not be liable to dent the sheet metal walls. Each of the pin members 46 may be slidably carried in an elongated bushing 48 fixed to extend through the periphery of a plate member 49 as by nuts 50. Pin members 46 may be normally resiliently urged toward the housing by coil springs 51 each encircling an extension formed on the end of the pin 46 opposite from the head portion 47. The degree of compression of the springs 51 may be adjusted as by thumb nuts 52 having threaded engagement with bracket members 53 carried on plate member 49. Remaining details of construction and operation of these parts will be apparent from Figs. 2, 5 and 6.

Plate members 49 as best shown in Fig. 3, may be rigidly fixed in positions parallel to the back side of each burner as by being welded to brackets 54, 55, which in turn are fixed to the sides of the burners and to the trunnion connections at 34. In order to normally retain the plate members 49 and the faces of the burners in generally perpendicular positions, pairs of brackets as at 56, 57 (Fig. 2) may be mounted on the rear side of each plate member 49 for engagement respectively with a pair of coil springs 58, 59 carried on suitable pins 60, 60' fixed to the upper and lower sides of yoke member 38 adjacent its connection to thrust rod 39. It will thus be apparent that as the cylinder devices 18, 18' are operated to move the burners up to working position, the pin members 46 will also be carried to positions such that their head portions 47 engage the housing wall which is to be unsoldered at a plurality of spaced points. As the pressure increases on these head portions, the springs 51 will yield, thus avoiding any danger of bending or denting the housing and at the same time causing the plate 49 and the burner to be yieldably tilted if necessary to bring the face portions of the burner into proper alignment with the housing wall portion. That is, the springs 58 and 59 will permit the two lower pin members 46 to apply together a pressure against the housing wall about equal to the pressure applied by the two upper pin members 46. At the same time the springs 51 will permit substantial equalization of the pressure as between each individual pin member and the other three.

For slightly displacing and thereby removing the wall portions or plates 21, 22 after the same have been unsoldered, a plurality of grappling devices or hook members may be provided as at 60, 61. These may all be of the same or similar construction, the hook members 60 being mounted preferably upon the top edges of the burners and the members 61 upon the inner vertical edges of the burners. The details of construction are best shown in Figs. 5 and 6. A plate member as at 62 may be bolted to the edge of the burner and provided with a yoke piece as at 63 carrying a pin 64 for pivotally mounting the hook 60 or 61. An adjustable stop member 65 may be mounted as shown on plate 62 at one side of the pin 64, while at the other side, a compression spring as at 66 may be inserted between the plate 62 and the end of the hook member, for normally urging the hook into contact with the stop member 65. As shown, the hook member may be formed with a relatively pointed portion 67 adapted when the burner is moved toward the housing, to slide over the periphery of the wall which is to be removed, and into the position shown in Fig. 5. Then when the burner is retracted to inactive position, the hook engages the periphery of the wall portion as shown in Fig. 6. It thus acts to displace the unsoldered wall portion and pull it free from the housing. Meanwhile the heads 47 of the spring pressed pin members 46 will as shown in Fig. 6, continue to yieldably engage the unsoldered wall portion and prevent it from being jammed against the burner, until the displaced wall portion is freed from the housing and permitted to fall to the bin or container 13. By placing some of the hook members at the top edge of the burner and others at the adjacent inner or rear side edge, upon operation, these hooks will tilt the unsoldered wall portion to a slight angle both vertically and horizontally, thereby insuring that the soldered seam along the bottom edge and front vertical edge, will also be separated. Thus it is unnecessary to provide any hook means at the bottom edge which would interfere with the dropping of the unsoldered wall or plate into the bin, and it also unnecessary to provide any such means at the front edge of the plate, which might interfere with convenience and quick insertion and removal of the meter housing.

As shown, in Fig. 1 gas to the burners may be supplied through a pipe 70 running from any suitable source. In order that the burner flames may be of a predetermined size and shape, the gas supply may preferably pass through a pressure regulating device as at 71 of a suitable known type. From this device the gas may be conducted by pipe 72, through a valve 73 connected as by a link 74 to a foot treadle 75. The foot treadle may normally be retained in its uppermost position as by a spring 76 and also connected to a timing device of a suitable known type located in a housing 77 and acting to retain the treadle, after it is pressed down, in its depressed position, for a predetermined interval of time and to thereupon allow the treadle to be restored by the spring 76. From the valve 73 the gas may pass through connections as at 78, 79, 80, etc., to each of the burners. Upon operating the treadle, the valve 73 is opened, allowing enough gas to be admitted to the burners to cause flames of a predetermined size to be projected for a period of time determined by the adjustment of the timing device 77, after which as will be apparent, the valve 73 will again be closed.

If desired, the foot treadle may also be arranged to control air under pressure for operating the cylinder devices 18, 18' for moving the burners into and out of active positions simultaneously with the control of the gas flames. For this purpose a two-way air valve 81 (Fig. 1) of suitable known type may be connected as by linkage 82 to the link 74. The valve 81 may serve to control air under pressure coming from a suitable source of supply through pipe 83 and so as to admit the pressure to pipes 84, 84' for operating pistons in the devices 18, 18' respectively, thereby moving the burners into active position just as the gas valve 73 is being opened. At this time air may also be discharged through the device 81 from the other side of each piston, through conduits as at 85, 85'. Then after the timing device 77 has held the treadle down for a predetermined interval, the action of the spring 76 in restoring the treadle and connecting linkage, will serve to reverse the air control valve 81, to apply air under pressure through pipes 85, 85' for retracting the burners, while air is being discharged from pipes 84, 84'.

When the valve 73 is closed, pilot flames at the burners may be fed by gas passing through a bypass connection as at 86. A gauge as at 87 may be conveniently connected as shown to this bypass for indicating the gas pressure to the operator, so that he may from time to time check and determine whether the correct pressure is being applied, both when the burners are in active and inactive positions, for insuring flames of a predetermined shape and size.

The gas conduit portions 79, 80 as shown may be of suitable flexible tubing so as to permit the necessary movement of the burners with respect to the stationary frame parts. As best shown in Fig. 2, the gas connections may be brought into the center of each burner through air mixing devices 89, 89' of suitable known type.

As above explained, after a gas meter has been in use for a considerable time, tar-like deposits will accumulate within the interior cavities, and accordingly if the meter chambers are heated while containing air in proper amounts, highly combustible or explosive gas mixtures may be formed. Hence in order to purge the meter chambers of such mixtures, a tank as at 90 containing carbon dioxide gas, or other suitable combustion-inhibiting gas, may be provided adjacent the apparatus. The outlet of this tank may be connected to a flexible hose as at 91. A spring pressed release valve as at 92 operable by the thumb, may be provided at the end of this hose for discharging the gas through a pair of outlet branches or nozzles as at 93 and 94. These nozzles are preferably so spaced that they will readily fit into two of the gas ports accessible through the opened top of the meter. That is, as soon as the meter to be unsoldered is put in place as in Fig. 2, and heat from the burners is applied, the operator should immediately apply the two nozzles 93, 94 to proper ports within the top of the meter, whereupon the valve 92 is pressed, allowing the purging gas to flush out the cavities within the meter before any danger of an explosion occurs.

During the application of the burner flames to the housing, considerable solder will drip down from the lower edges of the housing and means should therefore be provided to prevent such solder from falling into the bin or container 13 and thus onto the supply of plates or wall portions previously removed from other meters. For this purpose, drip plates as at 95 may be pivotally mounted on horizontal axes as at 96 (Fig. 2). These plates may be connected as by rods 97 through suitable yieldable means 98 to brackets 99 attached to the piston rods 42. Thus when the burners are moved to active position, these drip plates will also be moved by the pistons to the positions shown in full lines in Fig. 2, whereby the solder will be conducted down onto the lower areas 100 of the drip plates. Then when the burners are moved to retracted positions, and just prior to the time that the unsoldered plates drop down to the bin 13, the piston rods 42 will act to tilt the drip plates to retracted positions, whereby the solder on the plates will readily flow into drip pans as at 101.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. Apparatus for unsoldering and removing a portion of a gas meter housing which is soldered in place around its periphery, comprising: means for removably clamping the housing upon a support, a burner providing a flame for conforming substantially to said soldered periphery, means for mounting said burner for movement in directions toward and away from said portion and for normally supporting the burner in a position spaced substantially from the housing when initially clamped in position, spring pressed hook means also carried by said mounting means for extending over said periphery when said mounting means is moved toward the housing, and for removing said portion after being unsoldered, when the mounting means is moved away from the housing, and mechanism for moving said mounting means toward and away from the housing and concurrently so controlling fuel to the burner, as to increase the flame when the burner is close to the housing and decrease the flame when the burner is spaced substantially from the housing.

2. Apparatus for unsoldering and removing a portion of a sheet metal housing which is soldered in place around its periphery, comprising: means for removably clamping the housing upon a support, a burner providing a flame for conforming substantially to said soldered periphery, means for mounting said burner for movement in directions toward and away from said portion, and hook means also carried by said mounting means for extending over said periphery when said mounting means is moved toward the housing, and for engaging and removing said portion after being unsoldered, when the mounting means is moved away from the housing.

3. Apparatus for unsoldering and removing a portion of a sheet metal housing which is soldered in place around its periphery, comprising: means for removably clamping the housing upon a support, a burner providing a flame for conforming substantially to said soldered periphery, means for mounting said burner for movement in directions toward and away from said portion, and hook means operatively connected with said mounting means for engaging and removing said portion after being unsoldered, when the mounting means is moved away from the housing.

4. In apparatus for unsoldering a soldered seam, a burner shaped to provide a flame extending along the seam, a support for carrying said burner to and from an active position in directions respectively toward and away from such seam, trunnion means connecting said burner and support, and resilient stop means at spaced points on said burner for limiting the approach of such points respectively toward the seam, and whereby said stop means may act to tilt the burner on said trunnion means to bring the face of the burner when in active position, into a predetermined spaced relationship to the seam.

5. In apparatus for unsoldering gas meters, a pair of clamping members for engaging elongated recesses formed on two opposite side walls of the meter, at least one of said members having an elongated jaw portion for reception in one of said recesses to prevent angular movement of the meter while clamped in position, spring means associated with at least one of said members for releasably urging same into its clamping position, a burner shaped to provide a flame conforming to the soldered outline of a wall of the meter, hook means and supporting structure therefor constructed and arranged for carrying same into position for engaging edge portions of such wall, and for retracting the hook means to pull off the wall after unsoldering.

6. In apparatus for unsoldering a soldered seam on a sheet metal housing, a burner shaped to provide a ribbon of flame extending along the seam, a support for carrying said burner to and from an active position in directions respectively toward and away from such seam, stop means on said burner for limiting the approach of the burner toward the seam, said stop means being secured on the burner by means which is resilient along said directions, and means operatively connected to said support and constructed and arranged for grasping and removing an unsoldered portion of the housing upon movement of the burner away from the housing, said last named means being positioned to thrust said portion against said stop means in the direction of the resilient support thereof.

7. In apparatus for unsoldering a soldered seam on a sheet metal housing, a burner shaped to provide a ribbon of flame extending along the seam, a support for carrying said burner to and from an active position in directions respectively toward and away from such seam, resilient connecting means between said support and burner permitting the face of the burner to be tiltably adjusted with respect to the seam, fluid driven piston means for moving said support, and universal thrust joint means connecting said piston means and support.

ALFRED W. FULLER.